United States Patent Office 3,455,705
Patented July 15, 1969

3,455,705
SILICIOUS COMPOSITIONS FOR COATING HEAT SENSITIVE SURFACES
Robert L. Rusher, Wilmington, Del., assignor to E. I. du Pont de Nemours and Company, Wilmington, Del., a corporation of Delaware
No Drawing. Continuation-in-part of application Ser. No. 575,543, Sept. 15, 1966. This application Mar. 7, 1968, Ser. No. 711,214
Int. Cl. C04b 43/00
U.S. Cl. 106—38.23
13 Claims

ABSTRACT OF THE DISCLOSURE

The storage stability and coating characteristics of silicious compositions containing fused silica suspended in colloidal silica aquasols are improved by incorporating into the composition magnesium montmorillonite clays, Xanthomonas hydrophilic colloids or mixtures thereof; polyhydric aliphatic compounds and a phosphate ester of the formula $$O=P(OR)_3$$

where R can be the same or different on each position on the molecule and is H, $C_6H_5$, $H(CF_2)_nCH_2$ wherein $n=6$ to 10, $H(CH_2)_xCH_2$ where $x=6$ to 16, $(CH_2CH_2O)_yH$ where $y=1$ to 16, an alkali metal cation or a quaternary ammonium group, with the proviso that one R must be $H(CF_2)_nCH_2$, $H(CH_2)_xCH_2$ or $(CH_2CH_2O)_yH$.

Related applications

This application is a continuation-in-part of my copending application Ser. No. 575,543, filed Sept. 15, 1966, now abandoned, which was a continuation-in-part of my then copending applications Ser. No. 313,454, filed Oct. 3, 1963, now abandoned, and Ser. No. 511,346, filed Dec. 3, 1965, now abandoned, the latter application being a continuation-in-part application of my then copending application Ser. No. 430,213, filed Feb. 3, 1965, now abandoned.

Background of the invention

This invention relates to binder vehicles and compositions for thermal coatings. More particularly, the invention relates to silicious compositions containing granular, fused silica and a colloidal silica binder vehicle, the compositions being useful for producing heat resistant coatings on heat sensitive surfaces, and to colloidal silica binder vehicles themselves.

It is well appreciated in the art that silicious compositions containing fused silica suspended in colloidal silica aquasols can be used for coating heat sensitive surfaces and are particularly useful for applying to surfaces which are contacted by molten metals. In general, such surfaces will be those which, when contacted by molten metal, are subjected to erosion or fracture. Illustrative of such surfaces are the inner walls or molds used in casting metal ingots, in particular ingots of ferrous metals, and the metal "stools" on which the molds rest during teeming. These coating compositions also have release properties which alleviate the problem of the cast metal sticking to the molds or stools. Such compositions are also used to coat the surfaces or troughs or chutes used to transport molten metals, the interior surfaces of ladles, conveying receptacles, furnaces, and the like.

Such silicious compositions have suffered from the necessity of providing continuous stirring in order to keep the fused silica solids well suspended in the colloidal silica aquasol. With these compositions, when stirring is interrupted, the fused silica settles to the bottom of the vessel and, if allowed to remain undisturbed, rapidly agglomerates to a hard mass that frequently has to be removed by means of a hammer and chisel.

I have discovered an important means for improving such silicious compositions by incorporating therein certain suspending agents in order to maintain the silicious solids within the aqueous dispersion in suspension for extended periods of time. In addition, when these agents are used, by some mechanism which is not understood, even when stirring is interrupted for several hours or even days, the small amount of fused silica that has settled to the bottom of the vessel can be rapidly redispersed simply by stirring the mixture. I have also observed that the presence of the polyhydric aliphatic componds results in an important improvement in the coating characteristics on application to hot metal surfaces. I have also discovered that the coating characteristics of these compositions can be improved by the addition of certain phosphate esters.

Summary of the invention

In summary, this invention is directed to a silicious composition useful for coating heat-sensitive surfaces comprising fused silica dispersed in a colloidal silica binder vehicle, said vehicle containing a colloidal silica aquasol, the ratio of said silica to said colloidal silica in a range of from 10:0.5 to 10:60 on a solids by weight basis; from 0.05 to 2% by weight based on said colloidal silica aquasol of a suspending agent selected from the group consisting of magnesium montmorillinite clays, xanthomonas hydrophilic colloid and mixtures thereof; from 3 to 30% by weight based on the colloidal silica aquasol a polyhydric aliphatic compound; and from 0.01 to 1% by weight based on said colloidal silica aquasol a phosphate ester of the following formula $$O=P(OR)_3$$

where R can be the same or different on each position of the molecule and is selected from the group consisting of H, $C_6H_5$, $H(CF_2)_nCH_2$ wherein $n=6$ to 10, $H(CH_2)_xCH_2$ wherein $x=6$ to 16, $(CH_2CH_2O)_yH$ where $y=1$ to 16, an alkali metal cation, and a quarternary ammonium group; with the proviso that one R on the molecule is selected from the group consisting of $H(CF_2)_nCH_2$, $H(CH_2)_xCH_2$, and $(CH_2CH_2O)_yH$.

Detailed description of the invention

The suspending agents which are useful in these compositions include magnesium montmorillonite clays, xanthomonas hydrophilic colloids, and mixtures thereof.

The magnesium montmorillonite clays are available commercially. Of these clays, preferred are the magnesium aluminum silicates having a lath-like structure which are commonly known as hectorite-type clays. A clay suitable for the compositions of the present invention is "Benaqua," a product of National Lead Company. Bentonite and attapulgite type clays are also suitable but are less preferred.

A typical montmorillonite clay useful in these compositions appears in electron-micrographs to have an ultimate particle which is about one micron long, 100 to 200 millimicrons wide and one to 10 millimicrons thick.

Xanthomonas hydrophilic colloids are high molecular weight, exocellular polysaccharide gums made by fermentation. A suitable xanthomonas colloid is "Kelzan" made by the Kelco Company. This colloid is a polymer containing mannose, glucose, potassium glucuronate and acetyl in the approximate molar ratio of 2:1:1:1. This colloid is prepared by the whole culture fermentation of a medium by the bacterium, Xanthomonas compestris, in the manner described in U.S. Patent 3,067,038.

The medium used can be 2 to 5 percent commercial glucose, inorganic nitrogen source such as corn steep liquor or distillers dry solubles, dipotassium hydrogen phosphate and appropriate trace elements.

A preferred suspending agent is a mixture of a xanthomonas colloid with a magnesium montmorillonite clay. In the mixture, a preferred proportion is 1.5 parts colloid to 1 part clay, although this ratio is not critical and equal amounts of each, or more clay than colloid, can be used.

The suspending agent is present in the fused silica-colloidal silica aqueous suspension in an amount ranging from .05% to 2% by weight. Most preferred is an amount of about 0.25% by weight of the agent.

In formulating these improved compositions, the suspending agent can be added directly to the colloidal silica sol and incorporated therein. Alternatively, the suspending agent can be added to water and the resulting solution added to the colloidal silica aquasol. In any event, it is observed that high shear mixing, such as can be obtained in a Waring Blendor, or in a throttled centrifugal pump, while not absolutely critical, significantly improves the utility of the composition. The fused silica, having been ground to 200 mesh or smaller, is then added.

These compositions are advantageously used by spraying them upon the inner walls of ingot molds and upon the stool surfaces upon which the molds are placed. Because of the presence of the suspending agents, the silicious solids within the aqueous dispersion remains in the suspension for extended periods of time.

Under some conditions it is found that when these improved silicious compositions, incorporating the suspending agents, are applied to a hot metal surface, "blisters" can form in the coating. Because of their friable nature, such "blisters" are objectionable for a stool coating since there is a greater possibility for silicious inclusions to appear in the cast steel. It has also been found in practice that the silicious compositions incorporating a suspending agent under some conditions, exhibit poor wetting of the composition to a hot metal surface, e.g., a stool at 600° F. compared to the wetting of the composition to a cooler metal surface, e.g., a stool at 250° F. The wetting characteristics of these silicious compositions under some conditions, at the high temperatures is manifested by poor adhesion of the coating to the metal surface. Adhesion is poor because the aqueous portion of the colloidal silica aquasol volatilizes immediately on contacting the hot metal surface of the stool, forming a steam barrier or blanket between the forming coating and the metal surface.

It has been found in accordance with another aspect of the present invention that the above-discussed wetting and adhesion problems are greatly alleviated or eliminated by incorporating into the compositions one or more polyhydric aliphatic compounds having boiling points near the surface temperature of the stool. Wetting adjuvants can also be added as a means of further improving wetting and adhesion characteristics. The relative proportions of the ingredients of the composition should be controlled within a critical specified range of amounts as discussed subsequently.

As a further aspect of the invention, it has been found that the colloidal silica binder vehicle compositions comprising a colloidal silica aquasol and the previously-mentioned suspending agents are highly useful in themselves as a binder or carrying medium, in a manner similar to that shown for fused silica, for various other particulate and fibrous inorganic materials. Accordingly, this vehicle may be used as a binder for other forms of silica such as silica flour, sand, and diatomaceous earth. Likewise, in a manner similar to that in which it is employed as a vehicle for fused silica, this colloidal silica vehicle may also be used as a binder or medium for glass micro-balloons, alumina bubbles, gypsum, zirconium oxide, zircon, alumina in its various forms, magnesia, mullite, graphite, carbon, mica, talc, etc. It may also serve as a binder or medium for metal powders such as zinc dust, aluminum powder, etc. In addition, this vehicle can also be used to bind fibrous materials such as glass fibers, "Fiberfrax" alumino silicate fibers, rockwool, asbestos, and potassium titanate. Likewise, various formed inorganic materials can be bound to themselves or to substrates. Depending on the relative proportions of the vehicle and the particulate or fibrous material used, the resulting compositions can be applied to metal surfaces by spraying or painting or prepared as mortars or moldable masses for coating to metal objects.

When the colloidal silica binder vehicle compositions are to be used as the binder for compositions which are applied to hot metal surfaces, it is advantageous to incorporate in the composition a polyhydric aliphatic compound, and optionally, but preferably a wetting adjuvant.

Polyhydric aliphatic compounds for use in the various compositions of the invention are aliphatic alcohols, glycols, glycol ethers, and polyols having a boiling point in the range of from about 300° F. to about 650° F. which are soluble in water and soluble and compatible in the colloidal silica aquasol used in preparing the composition. The most preferred polyhydric compounds for the compositions of the invention are glycols derived from ethylene oxide and propylene oxide. Of these, the most preferred compounds are ethylene glycol, diethylene glycol, triethylene glycol, tetraethylene glycol, propylene glycol and dipropylene glycol. It is contemplated that any of the above compounds may be employed as the hydric compound component of the composition either alone or in mixture with one another, depending on the surface temperature of the surface to be coated.

Wetting adjuvants as mentioned previously are added for some particular aspects of this invention. In general, the wetting adjuvant must be compatible with the colloidal silica aquasol, and the suspending agent and be soluble in the aliphatic polyhydric compound. Many such adjuvants are known in the art and for certain aspects of this invention can be selected from lists such as "Detergents and Emulsifiers Annual," 1965 by John W. McCutcheon, Inc.

A preferred class of wetting adjuvant has been found to be surprisingly beneficial in certain compositions of this invention. These are a class of high temperature wetting adjuvants, as described more fully below, and are especially useful when incorporated into compositions comprising colloidal silica aquasol, suspending agent, and polyhydric aliphatic compound when such compositions are used in combination with fused silica for the coacting of hot stools, molds, and the like, where wetting and adhesion are a particular problem.

The high temperature wetting adjuvants for use in the compositions of the invention include a class of phosphate esters, prepared by reacting either phenols, fluoroalkyl alcohols, or fatty alcohols with phosphoric acid or phosphorous oxides. Also included are a class of phosphate esters which are prepared by reacting any of the above phosphate esters described with ethylene oxide to incorporate an ethylene oxide telomer alcohol unit therein. The above compounds can best be illustrated by the following general formula:

$$O=P(OR)_3$$

where R can be the same or different on each position of the molecule and is H, $C_6H_5$, $H(CF_2)_nCH_2$ wherein $n=6$ to $10$, $H(CH_2)_xCH_2$ wherein $x=6$ to $16$, $$(CH_2CH_2O)_yH$$

where $y=1$ to $16$, an alkali metal cation, or a quaternary ammonium group with the proviso that one R must be $H(CF_2)_nCH_2$, $H(CH_2)_xCH_2$ or $(CH_2CH_2O)_yH$.

It is to be understood that the compounds as illustrated above may exist in the form of the corresponding bisphosphate compounds or higher condensation products. Particularly preferred compounds for purposes of invention are modified polyethylene glycol type which can be represented by the formula:

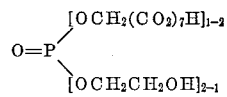

and those which can be represented by the formula:

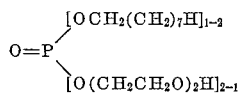

and fluoralkyl phosphates represented by the formula:

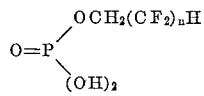

wherein $n=6$ to 10.

The granular fused silica suitable for use in the various compositions of the invention has a silica content of not less than 97% silica as $SiO_2$ and a thermal coefficient of expansion not greater than about $6 \times 10^{-7}$ cm./cm./° C. In preferred form the compositions contain fused silicas which have the highest $SiO_2$ content with the lowest coefficient of expansion. Thus a fused silica having a silica content of 97% and a coefficient of expansion from about $5.5-6 \times 10^{-7}$ cm./cm./° C. is less desirable than a thermal coefficient of expansion no greater than from about $4-5 \times 10^{-7}$ cm./cm./° C. A fused silica of the type useful in the practice of the present invention has the following typical analysis:

| Ingredients: | Percent by weight |
|---|---|
| $SiO_2$ | 97.3 |
| $Al_2O_3$ | 1.7 |
| Suboxides of silica | 0.55 |
| Elemental silicon | 0.45 |
|  | 100.00 |

A material of this type has a thermal coefficient of expansion of about $5 \times 10^{-7}$ cm./cm./° C. Silica products of this type are readily prepared by hammer-milling and grinding very pure fused silica glasses which are formed by reduction of relatively pure silica sands by graphite electrodes in an electric arc furnace.

Silica aquasols suitable for use in the compositions of the invention are described in Bechtold and Snyder U.S. Patent No. 2,574,902, Rule U.S. Patent No. 2,577,485, and White U.S. Patent No. 2,285,477; Alexander U.S. Patent No. 2,750,345, Marshall U.S. Patent No. 2,515,-960, Trial U.S. Patent No. 2,573,743, Atkins U.S. Patent No. 3,012,973, Legal U.S. Patent No. 2,724,701, and Dirnberger et al. U.S. Patent No. 2,974,109.

Such silica aquasols contain silica particles which are spherical and which have an average size from about 3 to 150 millimicrons. Preferably, the particle size is from about 5 to 50 millimicrons. The ratio $SiO_2:Na_2O$ can range from about 60:1 up to the upper limits of the above-cited patents. In general, these sols will be basic in nature.

The relative proportions of the ingredients present in the silicious compositions of the invention must be maintained within specified ranges of amounts in order to achieve the desiderata of the invention.

The suspending agent is present in amounts ranging from 0.05 to 2% by weight based on the colloidal silica aquasol, and preferably from 0.2 to 0.8% by weight.

The amount of hydric organic compound is maintained in a range of from 3 to 33% by weight based on the colloidal silica aquasol, and preferably is maintained in the range of 5 to 20% by weight. The high temperature wetting adjuvant is added in amounts ranging from 0.01 to 1% by weight based on the colloidal silica aquasol present, and preferably is maintained in the range of .05 to .15% by weight.

When the binder compositions of this invention are mixed with fused silica to produce a fluid mix suitable for spraying, etc., to afford a relatively thin refractory coating, the proportions of fused silica to colloidal silica present in the compositions, expressed on a solids weight basis, is maintained within the range of 10:0.5 to 10:60; the preferred range is 10:1 to 10:5 and 10:3 is a preferred proportion.

These silicious compositions of the invention containing fused silica and colloidal silica binder vehicle can have a total solids content ranging from about 30% to 80% by weight, with a total solids of about 65% by weight being most preferred.

In formulating the fused silica containing composition of the present invention, the components may be combined in several ways, dependent upon the intended mode of use. If it is desired to avoid mixing at the point of final use, then all of the constituents can be preblended at another location, using amounts of suspending agent at the higher levels of the herein specified range and shear mixing.

When this mode of preparation is followed, it is preferable to incorporate a stabilizing agent to minimize the evolution of gases, principally hydrogen, which otherwise can occur in the storage of the composition, particularly if elevated temperatures are involved during storage. Suitable agents for this purpose are water-soluble azo aromatic compounds such as disclosed in my copending application Ser. No. 369,589, filed May 22, 1964, assigned to my assignee. Other suitable stabilizing agents for this purpose are disclosed in my copending applications Ser. No. 369,616, filed May 22, 1964, and 369,617, filed May 22, 1964, also assigned to my assignee.

The amount of stabilizing agent required to effectively retard gaseous evolution is quite small and will vary to some extent depending upon the particular compound or mixture of compounds employed. Usually, an amount ranging between about 0.01% to 1% by weight based on the aqueous fused silica-colloidal silica suspension is preferred although some stabilization can occur with lower concentrations and higher concentrations can be used if desired.

The suspending agent may be shear mixed as described above, incorporating it into the colloidal silica aquasol, glycols added and finally the wetting adjuvant added. The fused silica may then be mixed with this vehicle at the point of use.

In the instances where the fused silica is added to the colloidal silica binder vehicle at the point of use, and it is not necessary to maintain the solids in suspension for very long periods, the amounts of suspending agent at the lower levels of the herein specified range may be employed.

The compositions of the present invention are most advantageously applied by spraying them upon the surfaces to be coated with conventional spraying equipment. Alternatively, the compositions can be applied by brushing, flow coating, dipping, or any other suitable means. Particularly good results are obtained when the compositions are sprayed upon surfaces which are at elevated temperatures to aid in driving off the volatile carrier.

During the preparation or the application of the compositions of the invention, a foaming problem may be created under some circumstances. If this problem arises, it can be alleviated by incorporating a silicone anti-foam agent in the composition. The anti-foam agents used are present in amounts raging from 10 to 1000 parts per million (active) based on the liquid phase by weight. By "liquid phase" is meant everything in the composition of the invention except the fused silica. The particular amount used will depend upon the agent and it is preferred to use the more active agent such that the maximum anti-foam activity is provided at the smallest concentration.

Commercially available anti-foam agents suitable for the compositions of the present invention are the following aqueous emulsions of methyl polysiloxanes, "GE-60" a product of General Electric (30% active); this agent is used at a rate of 20 p.p.m. (active) based on the liquid phase by weight, "Hodag FD-82" a product of Hodag Chemical Corp. (30% active); this agent is used at a rate of 30 p.p.m. (active), "Colloid 58 1B" a product of Colloids, Inc. (100% active); this agent is used at a rate of 600 p.p.m. (active).

Of the above agents, "GE-60" and "Hodag FD-82" are preferred in view of their greater activity.

A better understanding of the invention will be gained from the following working examples:

EXAMPLE 1

A 300 gallon mixing kettle is charged with 550 lbs. of colloidal silica aquasol containing 30% silica solids and having a $SiO_2/Na_2O$ ratio of 96 ("Ludox" HS Colloidal Silica, E. I. du Pont de Nemours & Co.) and while agitating vigorously, 8 lbs. of magnesium montmorillonite clay ("Benaqua," National Lead Company) are sifted into the sol and mixed until homogeneously dispersed therein.

The resulting slurry is then recirculated for one hour through a three-stage centrifugal pump, driven at 3450 r.p.m. to shear the clay. As the clay slurry thickens due to the shear mixing, an additional 550 lbs. of the "Ludox" HS Colloidal Silica sol is added to keep the slurry fluid. When no further thickening due to shear mixing is observed, a final amount of 900 lbs. of "Ludox" HS Colloidal Silica is added with continued mixing to bring the total silica sol content added to 2000 lbs., thus producing the highly sheared dispersion of 0.4% "Benaqua" clay in "Ludox" HS Colloidal Silica sol.

To this dispersion is then added slowly, with continued agitation, 2000 lbs. of a fused silica power of the following analysis:

| | Percent |
|---|---|
| $SiO_2$ | by weight 97.3 |
| $Al_2O_3$ | do 1.7 |
| Suboxides of silica | do 1.0 |
| Thermal coefficient of expansion, cm./cm.° C. | $5 \times 10^{-7}$ |

The resulting mold and stool coating composition has a pH of 9.6 and contain 65% solids. It is ready for use by spraying, dipping, or brushing onto the inner surfaces of metallurgical molds and stools.

The 65% solids contained in this composition remain homogeneously dispersed under both static and vibration storage. It is sufficiently fluid to be pumped through conventional metal and rubber piping without any clogging tendencies.

Coatings of this composition on the inner surfaces of steel casting molds and upper surfaces of casting stools substantially eliminated welding of cast ingots to the molds and stools and significantly reduced mold and stool erosion. Thus mold and stool life is prolonged, and ingots are readily removed from their molds. This composition, however, is not suitable for coating surfaces at a temperature above about 200 to 300° F.

EXAMPLE 2

The composition of Example 1 is prepared as described therein, except that 0.5% "Benaqua," montmorillonite clay is used instead of 0.2% and the clay is dispersed without shear mixing.

In the absence of shear mixing, the increased concentration of clay is satisfactory for maintaining the fused silica powder in suspension.

The resulting composition has the same properties and use characteristics as described for that of Example 1.

EXAMPLE 3

A 1059 lb. quantity of colloidal silica binder vehicle is prepared for use in a steel mill stool coating trial, having the final composition as follows:

| | Parts | Pounds |
|---|---|---|
| Colloidal silica aquasol | 100.0 | 660.0 |
| Xanthomonas hydrophilic colloid ("Kelzan") | 0.4 | 2.6 |
| Dipropylene glycol | 7.0 | 46.2 |
| Ethylene glycol | 3.0 | 19.8 |
| Water | 50.0 | 330.0 |
| Wetting adjuvant | 0.1 | 1.0 |
| | | 1,059.6 |

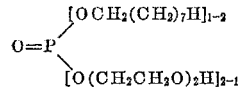

The preparation procedure empoyed is to first disperse the "Kelzan" in a mixture of ethylene and dipropylene glycols using a moderate amount of shear. Next, water is added and thoroughly blended. Finally, the colloidal silica aquasol and wetting adjuvant are added and blended for about two hours. This composition is utilized in the manner described in Example 4, with like results being obtained.

EXAMPLE 4

A 550 lb. quantity of colloidal silica binder vehicle is prepared for use in a steel mill stool coating trial, having the final composition as follows:

| | Parts | Pounds |
|---|---|---|
| Colloidal silica aquasol | 100.0 | 500.0 |
| "Benaqua" | 0.3 | 1.5 |
| Dipropylene glycol | 10.0 | 50.0 |
| Wetting adjuvant | 0.2 | 1.0 |

The preparation procedure employed is to first prepare 75 lbs. of high shear mixed, 2% solids "Benaqua" in Ludox® HS (a collodial silical aquasol containing 30% silica solids and having a $SiO_2/Na_2O$ ratio of 96, a product of E. I. du Pont de Nemours & Co.), by first dispersing the clay with paddle stirring and then recirculating the slurry through a 3 stage centrifugal pump for 4 hours, until when diluted as above, the liquid has a yield of greater than 3 dynes/cm.² Yield is calculated from viscosity measurements according to the expression $$\text{Yield value} = 12(V_6 - V_{12})_{100} = \text{dynes/cm.}^2$$

wherein $V_6$ and $V_{12}$ are apparent viscosities in centipoise as measured by a Brookfield Viscometer at 6 and 12 r.p.m., at 72–74° F., on a deaerated sample.

The 75 lbs. of 2% sheared "Benaqua" in Ludox® HS is diluted with 426.5 lbs. of additional Ludox® HS and mixed until homogeneous, after which is added slowly with mixing 50 lbs. of dipropylene glycol and 1 lb. of ethylene oxide actyl phosphate wetting adjuvent illustrated by the chemical formula in Example 3.

This binder vehicle is stable to phase separation on prolonged storage, does not freeze until its temperature is reduced below 20° F. and is not impaired by freezing after thawing.

This binder vehicle is transported to a steel mill where it is blended with an equal weight of fused silica powder. The mixture retains the solids in suspension for 24 hours without agitation, permitting storage in the mixing tank and delivery lines without settling. The mixture is flooded onto hot 500–600° F. stools by means of an open delivery pipe, where it spreads, wets, and dries quickly to an adherent, hard, dense, non-blistered coating.

Open end ingot molds are placed on the coated stools and basic oxygen process steel is poured into the molds. The molds and ingots are removed from the stools without "stickers," i.e. welding of the ingot to the stool. The coated stools are observed to be much less erroded than is usual for stools protected with other types of coatings.

The above test is repeated in a similar manner except for varying the proportions of suspending agent, glycol, and wetting adjuvent within the herein specified ranges.

The resultant silicious composition has substantially the same properties and use characteristics as described in the test above and distinctly superior to other known types of compositions.

EXAMPLE 5

A protective stool coating composition containing the listed ingredients is prepared as follows:

|  | Lbs. | Parts |
|---|---|---|
| Fused silica | 45.0 | 66.5 |
| Ludox ® HS | 66.7 | 100.0 |
| Ethylene glycol | 11.7 | 17.5 |
| "Benaqua" | 0.50 | 0.75 |
| Pontacyl light yellow GX | 0.23 | 0.35 |
| Ethylene oxide octyl phosphate wetting adjuvant | 0.10 | 0.15 |

The "Benaqua" is high shear mixed in a Waring Blender as a 2% dispersion in Ludox® HS; the mixture is sheared until a sample, diluted with the liquids as above has a yield of 35 dynes/cm.$^2$ (determined as in Ex 4).

To the 2% "Benaqua" paste in Ludox® HS is added the required dilution Ludox® HS, followed in turn with good mixing by Pontacyl Light Yellow GX dye, ethylene glycol and ethylene oxide octyl phosphate. After mixing until homogeneous, the fused silica powder is stirred in and mixed thoroughly.

The finished composition is bright yellow in color, has a density of 12.2 lbs./gal., contains 52.5% silica solids and has a viscosity of about 1000 cps. when measured at 73° F. with a Brookfield viscometer, spindle 2 at 6 r.p.m. The composition is stable to separation of solids for greater than two months when stored in a closed container. The presence of the azo dye prevents liberation of gaseous hydrogen in the container which may be due to the reaction of silicon on the fused silica with sodium hydroxide in the Ludox® HS. The composition does not freeze until its temperature is reduced below 13° F. and reconstitutes without damage on thawing and mixing.

The composition is tested in a steel mill as in Example 1, where it is applied from the shipping container without mixing, to a series of hot (400–600° F.) stools by simple pour-on application. The mixture wets the hot stools and dries quickly with rapid evolution of water vapor. The bright yellow coating is dense, adherent and free of blisters.

The coating performs equally as well as the coating of Example 1 as concerns protection of the coated stool and as a parting agent for the mold and ingot.

EXAMPLE 6

A colloidal silica binder vehicle is prepared in the following proportions:

|  | Parts |
|---|---|
| Colloidal silica aquasol | 100.0 |
| Xanthomonas hydrophilic colloid ("Kelzan") | 0.1 |
| Modified magnesium montmorillonite clay ("Benaqua") | 0.4 |
| Dipropylene glycol | 7.0 |
| Ethylene glycol | 3.0 |
| Water | 50.0 |
| Wetting adjuvant | 0.1 |

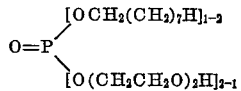

This vehicle is prepared in the same manner as in Example 4 except that water is added to the colloidal silica aquasol.

The resultant composition when combined with fused silica as in Example 1, is similar in appearance, properties and performance to the coating composition of Example 4, i.e., resistant to sedimentation for at least 24 hours; freezing below 32° F. and not harmed by frezing; excellent wetting and adhesion to hot stools; dense, hard, white coating relatively free of blisters and crust.

Performance as a protective stool coating is far superior to coatings used previously in the art, both from the standpoint of stool protection and ingot release. For coating hot stools, this composition is also much superior to the composition of Example 1. This superiority is attributed to the improved wetting characteristics obtained by the inclusion of the glycols and the wetting adjuvant.

The above test is repeated in a similar manner using various other hydric compounds within the scope of the invention in place of the mixture of glycols shown. The resultant silicious composition has very similar properties and use characteristics to that described for the test above.

EXAMPLE 7

A colloidal silica binder vehicle is prepared in the following proportions:

|  | Parts |
|---|---|
| Colloidal silica aquasol | 100 |
| Xanthomonas hydrophilic colloid | 0.107 |
| Modified magnesium monomorillonite clay ("Benaqua") | 0.16 |
| Ethylene glycol | 2 |
| Dipropylene glycol | 4.67 |
| Wetting adjuvant | 0.1 |

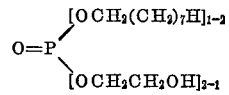

This vehicle is prepared in the same manner as used in Example 4 except that "Kelzan" and "Benaqua" are used rather than only "Benaqua," and ethylene glycol is used in addition to dipropylene glycol.

The vehicle is then transported to a steel mill where it is blended with an equal weight of fused silica powder and is then applied as set forth Example 4. Similar results are obtained.

Since many different embodiments of the invention may be made without departing from the spirit and scope thereof, it is to be understood that the invention is not limited by the specific illustrations except to the extent defined in the following claims.

What is claimed is:

1. A silicious composition useful for coating heat-sensitive surfaces comprising fused silica dispersed in a colloidal silica binder vehicle, said vehicle containing a colloidal silica aquasol, the ratio of said fused silica to said colloidal silica in a range of from 10:0.5 to 10:60 on a solids by weight basis; from 0.05 to 2% by weight based on said colloidal silica aquasol of a suspending agent selected from the group consisting of magnesium montmorillonite clays, xanthomonas hydrophilic colloid and mixtures thereof from 3 to 30% by weight based on the colloidal silica aquasol a polyhydric aliphatic compound having a boiling point of about 300° F. to 650° F. and is both water soluble and compatible in said colloidal silica aquasol; and from 0.01 to 1% by weight based on said colloidal silica aquasol a phosphate ester of the following formula:

$$O=P(OR)_3$$

where R can be the same or different on each position of the molecule and is selected from the group consisting of H, $C_6H_5$, $H(CF_2)_nCH_2$ wherein $n=6$ to 10, $H(CH_2)_xCH_2$ wherein $x=6$ to 16, $(CH_2CH_2O)_yH$ where $y=1$ to 16, an alkali metal cation, and a quaternary ammonium group; with the proviso that one R on the molecule is selected from the group consisting of $H(CF_2)_nCH_2$, $H(CH_2)_xCH_2$, and $(CH_2CH_2O)_yH$.

2. The composition of claim 1 wherein the suspending agent is magnesium montmorillonite clay.

3. The composition of claim 1 wherein the suspending agent is a mixture of magnesium montmorillonite clay and xanthomonas hydrophilic colloid.

4. The composition of claim 1 wherein the polyhydric aliphatic compound is a mixture of dipropylene glycol and ethylene glycol.

5. The composition of claim 1 wherein the phosphate ester is an alkyl phosphate of the formula

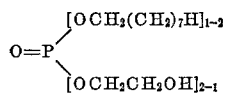

6. The composition of claim 1 wherein the phosphate ester is an alkyl phosphate of the formula

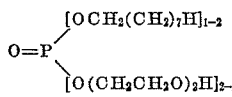

7. The composition of claim 1 wherein the polyhydric compound is a mixture of dipropylene glycol and ethylene glycol and the phosphate ester is an alkyl phosphate of the formula

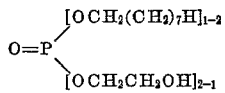

8. The composition of claim 1 wherein the polyhydric compound is a mixture of dipropylene glycol and ethylene glycol and the phosphate ester is an alkyl phosphate of the formula

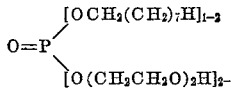

9. A colloidal silica binder vehicle containing a colloidal silica aquasol to which has been added from 0.05 to 2% by weight of a suspending agent selected from the group consisting of magnesium montmorillonite clays, xanthomonas hydrophilic colloids, and mixtures thereof, from 3 to 30% by weight of a polyhydric aliphatic compound having a boiling point of about 300° F. to 650° F. and is both water soluble and compatible in said colloidal silica aquasol, and from 0.01 to 1% by weight of a phosphate ester of the formula

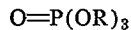

where R can be the same or different on each position of the molecule and is selected from the group consisting of H, $C_6H_5$, $H(CF_2)_nCH_2$ wherein $n=6$ to 10

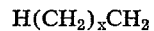

wherein $x=6$ to 16, $(CH_2CH_2O)_yH$ where $y=1$ to 16, an alkali metal cation, and a quaternary ammonium group; with the priviso that one R on the molecule is selected from the group consisting of $H(CF_2)_nCH_2$, $H(CH_2)_xCH_2$, and $(CH_2CH_2O)_yH$.

10. The composition of claim 9 in which the suspending agent is a mixture of magnesium montmorillonite clay and xanthomonas hydrophilic colloid.

11. The composition of claim 9 in which the suspending agent is magnesium montmorillonite clay.

12. The composition of claim 9 where the phosphate ester is phosphate of the formula

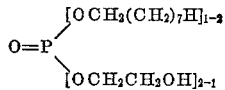

the polyhydric compound is a mixture of dipropylene glycol and ethylene glycol and the suspending agent is a mixture of magnesium montmorillonite clay and xanthomonas hydrophilic colloid.

13. The composition of claim 9 where the phosphate ester is a phosphate of the formula

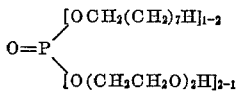

References Cited

UNITED STATES PATENTS

| | | | |
|---|---|---|---|
| 2,656,372 | 10/1953 | Ernst | 252—89 |
| 3,184,815 | 5/1965 | Reuter | 117—53 |
| 3,024,125 | 3/1962 | Lee | 106—287 |
| 3,364,040 | 1/1968 | Criss | 106—38.35 |

JULIUS FROME, Primary Examiner

T. MORRIS, Assistant Examiner

U.S. Cl. X.R.

106—35, 38, 209; 117—5.2, 5.3